US012285784B2

(12) United States Patent
Wen et al.

(10) Patent No.: US 12,285,784 B2
(45) Date of Patent: Apr. 29, 2025

(54) TRENCHLESS MULTI-STAGE PIPE CLEANING DEVICE AND METHOD COMBINING ARTIFICIAL TORNADO AND DAGGER-LIKE MECHANICAL SAND

(71) Applicant: SHIJIAZHUANG TIEDAO UNIVERSITY, Shijiazhuang (CN)

(72) Inventors: Jiwei Wen, Shijiazhuang (CN); Pengshuai Zhang, Shijiazhuang (CN); Wenjiang Li, Shijiazhuang (CN); Xianmin Han, Shijiazhuang (CN); Zhichun Liu, Shijiazhuang (CN); Xingliang Sun, Shijiazhuang (CN); Pengcheng Wang, Shijiazhuang (CN); Weige Han, Shijiazhuang (CN); Lin Gao, Shijiazhuang (CN)

(73) Assignee: SHIJIAZHUANG TIEDAO UNIVERSITY, Shijiazhuang (CN)

( * ) Notice: Subject to any disclaimer, the term of this patent is extended or adjusted under 35 U.S.C. 154(b) by 0 days.

(21) Appl. No.: 18/267,104

(22) PCT Filed: May 24, 2023

(86) PCT No.: PCT/CN2023/096000
§ 371 (c)(1),
(2) Date: Aug. 1, 2024

(87) PCT Pub. No.: WO2023/241325
PCT Pub. Date: Dec. 21, 2023

(65) Prior Publication Data
US 2025/0108413 A1 Apr. 3, 2025

(30) Foreign Application Priority Data
Jun. 15, 2022 (CN) ........................ 202210679071.3

(51) Int. Cl.
*B08B 9/027* (2006.01)
*B08B 9/032* (2006.01)
(Continued)

(52) U.S. Cl.
CPC ............ *B08B 9/027* (2013.01); *B08B 9/0328* (2013.01); *B08B 9/035* (2013.01); *B24C 1/086* (2013.01);
(Continued)

(58) Field of Classification Search
CPC .............................................. B08B 9/027–057
See application file for complete search history.

(56) References Cited

U.S. PATENT DOCUMENTS 4,816,296 A * 3/1989 Gibson .................. B05D 7/222 427/195
5,783,256 A * 7/1998 Matsuda ................ B05D 7/222 427/230
2014/0182622 A1 7/2014 Gillanders et al.

FOREIGN PATENT DOCUMENTS

CN 203170654 U 9/2013
CN 104480309 A * 4/2015
(Continued)

*Primary Examiner* — Eric W Golightly
*Assistant Examiner* — Richard Z. Zhang
(74) *Attorney, Agent, or Firm* — Bayramoglu Law Offices LLC

(57) ABSTRACT

A trenchless multi-stage pipe cleaning device and method combining an artificial tornado and dagger-like mechanical sand is provided. The trenchless multi-stage pipe cleaning device includes a primary pipe cleaning device and a secondary pipe cleaning device that are connected. An outer wall of the pipe cleaning device is provided with multiple air inlet joint pipes evenly distributed in a circumferential direction. The air inlet joint pipes are connected to an air compressor. Each of the air outlet joints is connected to a nozzle. The primary pipe cleaning device is connected to a
(Continued)

vibrating screen. The trenchless multi-stage pipe cleaning device further includes a back-end sewage discharge device. In the trenchless multi-stage pipe cleaning method, the mechanical sand continuously scrape and collide with the inner wall of the cleaning target, so as to achieve a desired efficient trenchless water-free pipe cleaning effect.

8 Claims, 8 Drawing Sheets

(51) Int. Cl.
*B08B 9/035* (2006.01)
*B24C 1/08* (2006.01)
*B24C 3/32* (2006.01)

(52) U.S. Cl.
CPC ........ *B24C 3/325* (2013.01); *B08B 2209/032* (2013.01)

(56) References Cited

FOREIGN PATENT DOCUMENTS

| | | | |
|---|---|---|---|
| CN | 105642620 | A | 6/2016 |
| CN | 209205958 | U | 8/2019 |
| CN | 115055453 | A | 9/2022 |
| EP | 1946854 | A1 | 7/2008 |

* cited by examiner

TRENCHLESS MULTI-STAGE PIPE CLEANING DEVICE AND METHOD COMBINING ARTIFICIAL TORNADO AND DAGGER-LIKE MECHANICAL SAND

CROSS REFERENCE TO THE RELATED APPLICATIONS

This application is the national phase entry of International Application No. PCT/CN2023/096000, filed on May 24, 2023, which is based upon and claims priority to Chinese Patent Application No. 202210679071.3, filed on Jun. 15, 2022, the entire contents of which are incorporated herein by reference.

TECHNICAL FIELD

The present disclosure belongs to the technical field of internal cleaning of existing underground pipes (culverts) and drill strings, and specifically relates to a trenchless multi-stage pipe cleaning device and method combining an artificial tornado and dagger-like mechanical sand.

BACKGROUND

Various pipes (culverts) in the fields of water supply, sewage discharge, heat, electricity, oil, gas, and communication are laid at a certain depth underground in cities and towns, and crisscross like a human blood network. They are responsible for the transfer of materials, resources, and information day and night, and undoubtedly are essential underground infrastructure for maintaining the daily operation of cities and towns. The performance of these pipes (culverts) directly determines the living quality of urban populations and the normal operation of industry and agriculture. However, it is inevitable that a lot of dirt will accumulate inside the pipe (culvert) after a certain period of use. If the dirt is not removed in time, the conveyed fluid will be contaminated, and the effective cross-sectional area of the pipe (culvert) will inevitably be reduced. This will affect the normal transfer of the fluid required for human life/production, reducing the quality of human life/production, and accelerate the rusting/corrosion and damage/failure of the pipe (culvert) itself, causing many unnecessary losses. Therefore, it is necessary to clean urban underground pipes (culverts) in time after they operate for a long period of time. Pipes (culverts) with large specifications are accessible for dedicated personnel to conduct manual cleaning operations. However, for pipes (culverts) with small specifications, they are inaccessible, and can only be cleaned with a suitable trenchless unmanned pipe cleaning method. At present, the commonly used trenchless unmanned pipe cleaning methods mainly include a self-advancing nozzle and high-pressure water jet combined method, a hydraulic pulse oscillation method, a rubber cleaner scraping method, a pipe robot drilling method, and a chemical cleaner method, etc. Although these methods can achieve trenchless cleaning of underground pipes (culverts), there are some prominent problems in pipe cleaning practices. For example, there is a serious waste of water resources, it is difficult to discharge sewage in time after pipe cleaning, the movement of the pipe cleaning device or pipe robot in the pipe (culvert) is hindered, the cleaning of the pipe (culvert) wall is not thorough, the pipe cleaning efficiency is not high, and the chemical cleaner is highly toxic, etc.

Moreover, a drill string is a bottom hole assembly that connects surface drilling devices (drilling rig/mud pump/air compressor, etc.) with underground drilling and grinding devices (drill bit/grinding head, etc.) or bottom hole power devices (screw drilling tool/turbo drilling tool, etc.), and the drill string mainly includes a kelly bar, a special joint, a drill rod, and a drill collar, etc. The drill string has basic functions such as tripping the drill bit, applying drilling pressure, transmitting power, conveying flushing fluid, and conducting special downhole operations (handling downhole accidents), and is one of the essential key components of drilling operations. However, after each drilling operation, flushing residues such as mud are attached to the inner and outer walls of the drill string. If these residues are not removed in time, it is easy to cause rusting/corrosion of the drill string, as well as blockage or even rupture/damage to the internal flow cross-section of the drill string. Currently, the residues attached to the outer wall of the drill string are easy to remove. However, due to the limitation of the inner diameter of the drill string, the residues attached to the inner wall of the drill string are difficult to remove. The commonly used method for removing the residues attached to the inner wall of the drill string is similar to the aforementioned trenchless unmanned pipe cleaning method, and has basically the same prominent problems.

SUMMARY

In order to address the above technical problems, the present disclosure is based on the formation principle of a tornado to generate an artificial tornado through a special internal flow channel structure of a pipe cleaning device. The artificial tornado carries low-roundness, sharp mechanical sand, spiraling along the inner wall of a cleaning target from one end to the other end like a sharp dagger. The mechanical sand can be ready-made mechanical sand purchased from the building materials market. The mechanical sand can also be prepared by crushing large stones or waste (asphalt) concrete blocks, broken stones, brick slag, and other construction solid waste generated during the new construction, reconstruction, expansion, or demolition process on site by a rock crusher to a required specification, achieving the reuse of construction solid waste. The artificial tornado with tangential and vertical movements can continuously suck and carry the mechanical sand dropped from a vibrating screen, so as to make the mechanical sand spiral forward against the wall. The mechanical sand scrapes and collides with the inner wall of the cleaning target to remove dirt attached. The artificial tornado has strong suction power, which can remove the dirt that falls from the inner wall of the pipe (culvert)/drill string and is accumulated on the bottom of the pipe (culvert)/drill string in time. Therefore, the present disclosure can achieve efficient trenchless water-free cleaning of existing underground pipes (culverts) or drill strings.

The present disclosure adopts the following specific technical solutions.

The trenchless multi-stage pipe cleaning device combining an artificial tornado and dagger-like mechanical sand includes a front-end pipe cleaning device, where the front-end pipe cleaning device includes a primary pipe cleaning device and a secondary pipe cleaning device;

the primary pipe cleaning device includes a primary right-end flange, a primary pipe cleaning device body and a primary left-end flange that are connected in sequence; multiple primary air inlet joint pipes are evenly distributed on an outer wall of the primary pipe cleaning device in a circumferential direction; and an axis of each of the primary air inlet joint pipes is diagonally intersecting with an axis of an inner chamber of the primary pipe cleaning device body in a same plane;

the secondary pipe cleaning device includes a secondary right-end flange, a secondary pipe cleaning device body and a secondary left-end flange that are connected in sequence; multiple secondary air inlet joint pipes are evenly distributed on an outer wall of the secondary pipe cleaning device in the circumferential direction; and an axis of each of the secondary air inlet joint pipes is diagonally tangent to a wall surface of an inner chamber of the secondary pipe cleaning device body;

the primary left-end flange is connected to the secondary right-end flange, such that the primary pipe cleaning device is hermetically connected to the secondary pipe cleaning device;

the primary air inlet joint pipes and the secondary air inlet joint pipes are hermetically connected to air outlet joints of a multi-channel directional valve, respectively; the multi-channel directional valve further includes an air inlet joint and a hollow multi-channel directional valve body; the air inlet joint is connected to an air compressor; each of the air outlet joints is connected to a nozzle provided with an internal flow channel having a necked-down section; and each of the air outlet joints is provided with a shut-off valve for adjusting start, stop, and a flow rate of a compressed air flow;

the primary right-end flange of the primary pipe cleaning device is securely connected to an inlet flange of a feed pipe, and the feed pipe is connected to a discharge hole of a vibrating screen;

the primary air inlet joint pipes and the secondary air inlet joint pipes are adjustable joint pipes; each of the adjustable joint pipes includes a rigid sleeve and a crank-connecting angle changing mechanism; the crank-connecting angle changing mechanism includes an S-shaped guide rail, a guide screw, an adjusting nut, and a telescopic guide rod; S-shaped guide rails are evenly arranged on each of the outer wall of the primary pipe cleaning device and the outer wall of the secondary pipe cleaning device at intervals; the S-shaped guide rail is provided with a guide groove; a bottom end of the guide screw is provided with a slider nested inside the guide groove; the guide screw is slidable freely along the guide groove in an S-shape; a top surface of the guide groove is provided with multiple limit holes at intervals; a lower part of the guide screw is provided with a limit base having screw holes on two sides; and when the guide screw slides to a suitable position, the limit base is securely connected to the limit holes through screws to fix the guide screw;

a thread of the guide screw is connected to a thread of the adjusting nut;

the adjusting nut is fixed at one end of the telescopic guide rod, and upper and lower sides of the adjusting nut are provided with fastening nuts; and the other end of the telescopic guide rod is hinged with the rigid sleeve; the rigid sleeve is coaxially sleeved outside a flexible corrugated pipe; and the flexible corrugated pipe is hermetically connected to each of the inner chamber of the primary pipe cleaning device body and the inner chamber of the secondary pipe cleaning device body.

The trenchless multi-level pipe cleaning device further includes a back-end sewage discharge device; the sewage discharge device is a sewage storage tank or a sewage suction truck; and the trenchless multi-level pipe cleaning device further includes another set of pipe cleaning device.

The trenchless multi-stage pipe cleaning method combining an artificial tornado and dagger-like mechanical sand uses the trenchless multi-stage pipe cleaning device, and includes the following steps:

mounting the front-end pipe cleaning device at one end of the cleaning target, and connecting the other end of the cleaning target to the back-end sewage discharge device;

opening shut-off valves of the corresponding air outlet joints of the multi-channel directional valve according to a number of the primary air inlet joint pipes and a number of the secondary air inlet joint pipes; and starting the air compressor to deliver compressed air with a certain air pressure and air volume to the inner chamber of the primary pipe cleaning device body and the inner chamber of the secondary pipe cleaning device body through the multi-channel directional valve, the nozzle, the primary air inlet joint pipes, and the secondary air inlet joint pipes;

if the pipe cleaning on-site conditions permit, starting the vibrating screen, and slowly pouring sharp mechanical sand particles onto a screen mesh of the vibrating screen; allowing sand particles filtered by the screen mesh to enter into the vibrating screen and slide along the feed pipe to a region adjacent to the primary right-end flange; sucking the sand particles by multiple streams of diagonally supplied high-speed air in the inner chamber of the primary pipe cleaning device body to form a primary gas-solid mixed flow, and allowing the primary gas-solid mixed flow to enter the inner chamber of the secondary pipe cleaning device body; forming an artificial tornado by multiple streams of diagonally tangential high-speed air entering the inner chamber of the secondary pipe cleaning device body; changing, by the artificial tornado, a movement trajectory of the primary gas-solid mixed flow entering the inner chamber of the secondary pipe cleaning device body into a spiral shape, tangential with an inner wall of the cleaning target; and driving the primary gas-solid mixed flow to move forward to form a secondary gas-solid mixed flow; where during this process, the sand particles continuously scrape and collide with the inner wall of the cleaning target, like sharp daggers, such that dirt attached to the inner wall of the cleaning target and accumulated on a bottom of the cleaning target is continuously removed;

during a pipe cleaning process, if the primary gas-solid mixed flow formed in the primary pipe cleaning device and the secondary gas-solid mixed flow formed in the secondary pipe cleaning device are found not sufficient to achieve a desired pipe cleaning effect, increasing the air pressure and air volume of the compressed air output by the air compressor; alternatively, adjusting inclination angles of the primary air inlet joint pipes and inclination angles of the secondary air inlet joint pipes, so as to adjust a movement state of the primary gas-solid mixed flow generated in the inner chamber of the primary pipe cleaning device body and a movement state of the secondary gas-solid mixed flow generated in the inner chamber of the secondary pipe cleaning device body, until the desired pipe cleaning effect is achieved; and discharging the removed dirt into the sewage discharge device.

Tornados are local meteorological disasters, which can cause serious disasters, such as uprooting of large trees, overturning of trucks, instant destroy of crops and fruit trees, traffic interruption, house collapse, and other human and animal damage. In nature, a tornado is often a vertical rotating column of air occurring between the bottom of a heap cloud system and the underlying surface. The tornado usually brings about winds with a speed of 30-130 m/s, has a diameter of less than 2 km, and overwhelms within 0-25 km, lasting for about 10 min. The generating conditions of tornados include wind shear (induced swirl) near the ground, vertical movement, and unstable energy. Tornadoes have enormous energy and strong suction. Based on the formation principle of tornadoes, artificial tornadoes have been creatively used in engineering and technical fields such as solar-tornado power stations and dust/smoke extraction, with significant advantages such as green, clean, and efficient.

Specifically, the present disclosure is different from conventional methods such as high-pressure water jet, hydraulic pulse oscillation, rubber pipe cleaner, and chemical cleaner used for cleaning existing underground pipes (culverts)/drill strings. In the present disclosure, based on the formation principle of tornadoes, the pipe cleaning device is provided, which includes the primary pipe cleaning device and the secondary pipe cleaning device, or may be a multi-level pipe cleaning device combining the primary pipe cleaning device and the secondary pipe cleaning device. The pipe cleaning device is connected to one end of the target cleaning pipe (culvert)/drill string. The air compressor continuously delivers compressed air with a certain air pressure and volume to multiple nozzles and air inlet joint pipes of the pipe cleaning device through the multi-channel directional valve. The axis of each of the multiple inlet joint pipes of the primary pipe cleaning device and the axis of the inner chamber of the primary pipe cleaning device are diagonally intersecting in the same plane (with an angle of 20-70°). Multiple streams of compressed air entering the inner chamber of the primary pipe cleaning device through the air inlet joint pipes converge and move forward in the inner chamber. After passing through the necked-down section (Laval nozzle) located in the inner chamber of the primary pipe cleaning device, the flow rate of the compressed air increases. The axis of each of the multiple air inlet joints of the secondary pipe cleaning device is diagonally tangent to the wall surface of the inner chamber of the secondary pipe cleaning device (with an angle of 25-75°), causing the multiple streams of compressed air tangentially entering the inner chamber of the secondary pipe cleaning device at a high speed to form an air flow (i.e., an artificial tornado) that is diagonally tangent to the inner wall of the secondary pipe cleaning device and rotates forward. It should be noted here that the air inlet joint pipes are easy to manufacture in a cylindrical form. However, in order to further increase the flow rate of the compressed air provided by the air compressor to enter the inner chamber of the pipe cleaning device, a nozzle having a necked-down section is connected to the inlet end of each of the air inlet joint pipes. The inlet end of the air inlet joint pipe can be threaded to the nozzle, making it easy for disassembly and replacement. The sharp mechanical sand that slides into the right end of the primary pipe cleaning device from the vibrating screen is forcefully sucked and wrapped by the multiple streams of air, and is moved along the inner wall of the cleaning target in a spiral shape along with the artificial tornado generated in the inner chamber of the multi-stage pipe cleaning device. During the movement process, the sharp mechanical sand scrapes and collides with the inner wall of the cleaning target like a sharp dagger to remove dirt attached to the inner wall of the cleaning target, and is discharged from the cleaning target together with the artificial tornado. In addition, the number and combination of the primary pipe cleaning device and the secondary pipe cleaning device are flexibly adjustable according to on-site conditions.

The other end of the cleaning target can be connected to the sewage storage tank or sewage suction truck through a high-pressure rubber hose. Alternatively, the two ends of the cleaning target can be connected to the multi-stage pipe cleaning device, and the multi-stage pipe cleaning device located at one side of the outlet end of the cleaning target is connected to the sewage storage tank or sewage suction truck through a high-pressure rubber hose. If the cleaning target is directly connected to the sewage storage tank, a gas-solid mixed flow of sand and dirt enters the sewage storage tank directly along the high-pressure rubber hose. After the entire cleaning operation is completed, the solid particle mixture in the sewage storage tank is screened to achieve reuse of the mechanical sand. If the cleaning target is directly connected to the sewage suction truck, the gas-solid mixed flow of sand and dirt not only has a spiral forwarding force, but also receives an additional suction force provided by the sewage suction truck, enhancing the suction and removal efficiency of dirt. If the cleaning target is connected to the multi-stage pipe cleaning device and the sewage suction truck in turn, the artificial tornado effect can also be generated at the outlet end of the cleaning target due to the suction effect of the sewage suction truck on the air in the inner chamber of the multi-stage pipe cleaning device. This further enhances the spiral suction and removal effect of the gas-solid mixed flow of sand and dirt.

In addition, considering the different effects of artificial tornadoes generated due to different air supply angles, the present disclosure further proposes a pipe cleaning device with an adjustable air supply angle. That is, the inclination angles of the air inlet joint pipes of the pipe cleaning device are flexibly adjustable according to the actual working conditions. An outer wall of the pipe cleaning device is provided with the crank-connecting angle changing mechanism, the rigid sleeve, and the flexible corrugated pipe. The flexible corrugated pipe is hermetically connected to the inner chamber of the pipe cleaning device. The rigid sleeve is coaxially sleeved outside the flexible corrugated pipe, and the rigid sleeve is not securely connected to the flexible corrugated pipe and the outer wall of the pipe cleaning device. A middle part of the rigid sleeve is hinged with the telescopic guide rod of the crank-connecting angle changing mechanism. The crank-connecting angle changing mechanism is connected to the outer wall of the pipe cleaning device in a slidable manner. That is, the guide screw of the crank-connecting angle changing mechanism is freely slidable along the guide groove of the S-shaped guide rail securely connected to the outer wall of the pipe cleaning device and can be fixed in a suitable position. The design achieves the purpose of adjusting the inclination angle of the flexible corrugated pipe, thereby changing the rotation direction, movement mode, and suction effect of the artificial tornado.

In summary, the present disclosure is based on the formation principle of tornadoes to generate an artificial tornado that is rotatable and has strong suction force in a target existing pipe (culvert)/drill string underground. The artificial tornado carries the sharp mechanical sand to move in a spiral shape from one end to the other end along the inner wall of the target pipe (culvert)/drill string. During this process, the mechanical sand scrapes and collides with the inner wall of the pipe (culvert)/drill string to remove the dirt attached to the inner wall of the pipe (culvert)/drill string and that accumulated on the bottom of the pipe (culvert)/drill string. Under the suction force provided by the artificial tornado or the sewage suction truck, the dirt is expelled from the pipe (culvert)/drill string. The mechanical sand after use is screened for the purpose of reuse, thereby achieving efficient and green trenchless water-free pipe cleaning operation. The present disclosure is suitable for trenchless cleaning operations of pipes (culverts)/drill strings with various types of ends such as flanged ends, threaded ends, and flat ends. Compared to the existing conventional pipe cleaning methods, the present disclosure has significant advantages in safety, efficiency, low-carbon, and environmental protection, and has broad prospects for application and promotion.

BRIEF DESCRIPTION OF THE DRAWINGS

FIG. 1(*b*) is a schematic diagram showing a cleaning target with one end connected to a sewage suction truck and the other end connected to a pipe cleaning device;

FIG. 1(*c*) is a schematic diagram showing a cleaning target with two ends connected to pipe cleaning devices, respectively;

FIG. 3(*b*) is a schematic diagram showing a cleaning target with two flat ends and an end flange of a pipe cleaning device;

FIG. 3(*c*) is an exploded view of a flat-end outlet flange;

FIG. 3(*d*) is an overall structural diagram of the flat-end outlet flange;

FIG. 4(*a*) is an overall structural diagram of the trenchless multi-stage pipe cleaning device combining an artificial tornado and dagger-like mechanical sand according to the present disclosure;

FIG. 4(*b*) is a perspective view of the trenchless multi-stage pipe cleaning device combining an artificial tornado and dagger-like mechanical sand according to the present disclosure;

FIG. 4(*c*) is an exploded view of the trenchless multi-stage pipe cleaning device combining an artificial tornado and dagger-like mechanical sand according to the present disclosure;

FIG. 5(*b*) is a section view of the primary pipe cleaning device according to the present disclosure;

FIG. 6(*b*) is an exploded view of the secondary pipe cleaning device according to the present disclosure;

FIG. 8(*b*) is a perspective view of the adjustable joint pipe, with some components separated, according to the present disclosure.

DETAILED DESCRIPTION OF THE EMBODIMENTS

The specific technical solutions of the present disclosure are illustrated in conjunction with examples.

Figure 1A:
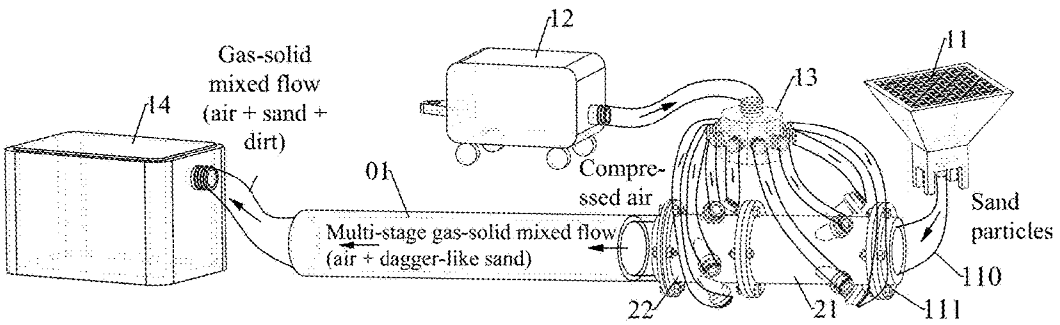
FIG. 1(*a*) is a schematic diagram showing a cleaning target with one end connected to a sewage storage tank and the other end connected to a pipe cleaning device.
Figure 1B:
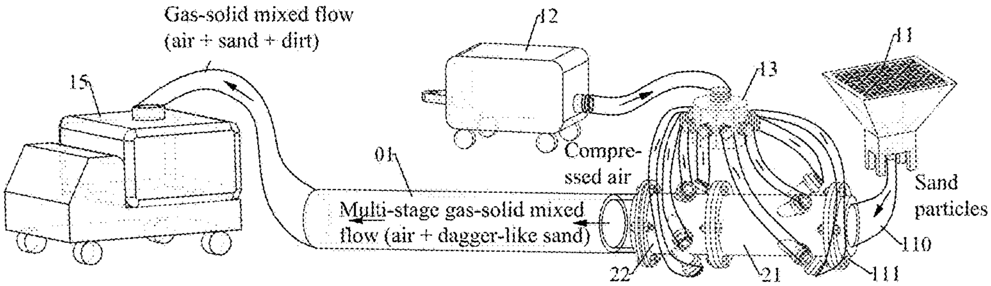
Figure 1C:
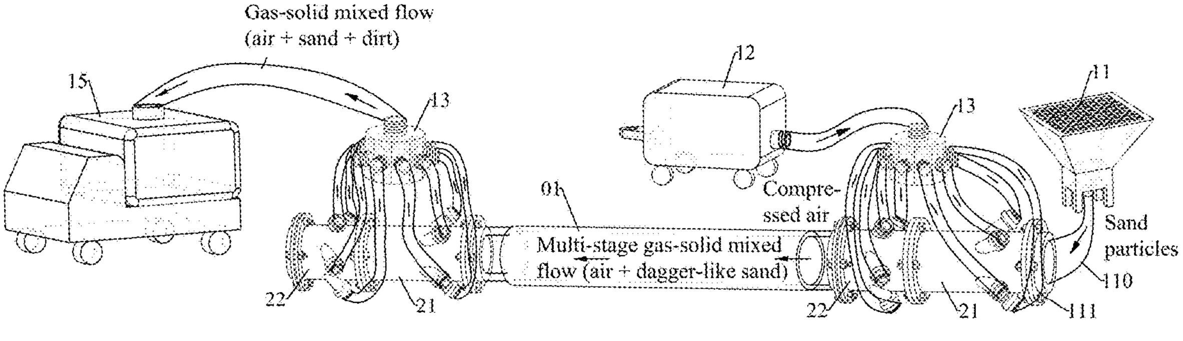
Figure 4A:
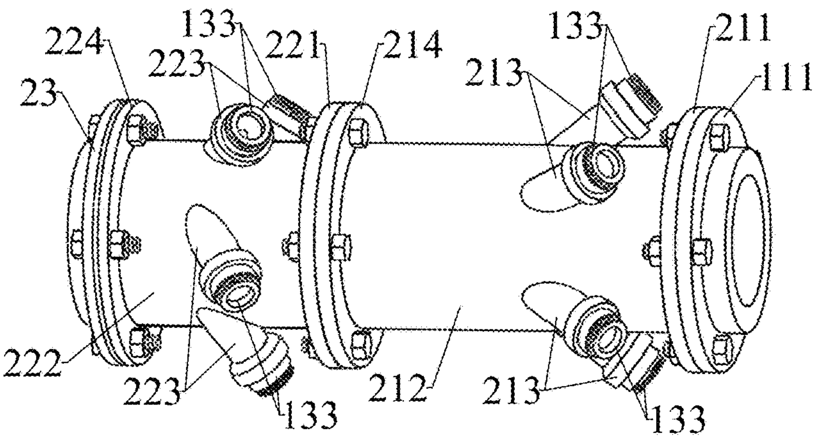
FIG. 4 is an overall structural diagram of a trenchless multi-stage pipe cleaning device combining an artificial tornado and dagger-like mechanical sand according to the present disclosure.
Figure 4B:
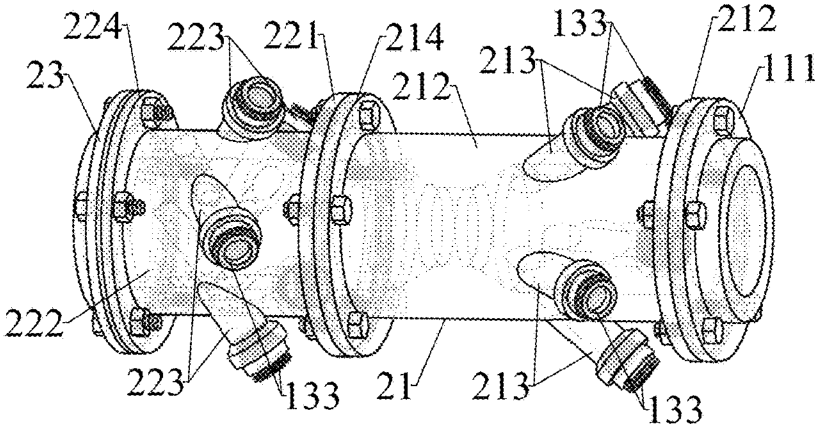
Figure 4C:
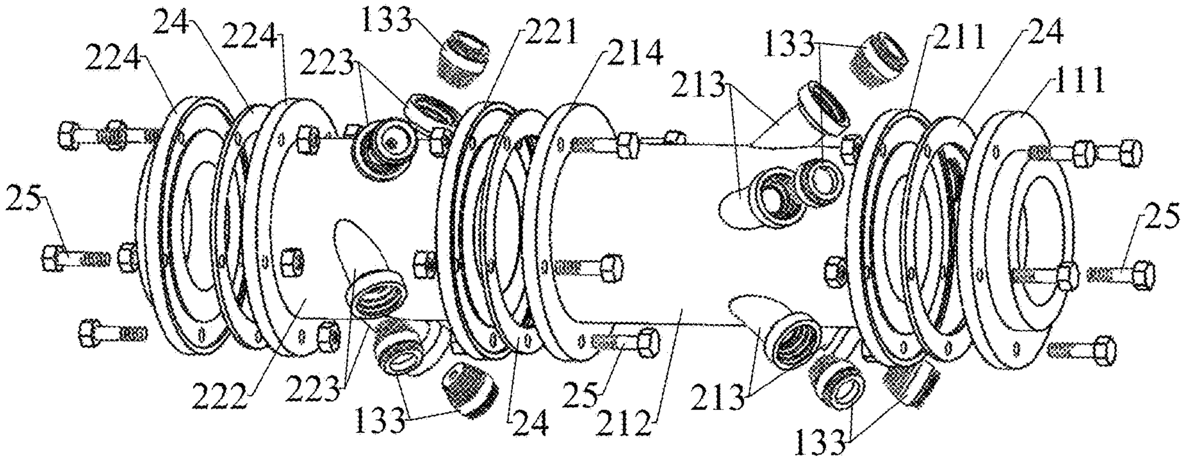

As shown in FIGS. 1(*a*) to 1(*c*) and FIGS. 4(*a*) to 4(*c*), the present disclosure relates to a trenchless multi-stage pipe cleaning device combining an artificial tornado and dagger-like mechanical sand. The trenchless multi-stage pipe cleaning device includes vibrating screen 11, air compressor 12, multi-channel directional valve 13, sewage storage tank 14 or sewage suction truck 15, primary pipe cleaning device 21, secondary pipe cleaning device 22, S-shaped guide rails 31, guide screws 32, adjusting nuts 33, telescopic guide rods 34, rigid sleeves 36, flexible corrugated pipes 35, and other supporting accessory components.

A target pipe (culvert) or drill string to be cleaned is referred to as cleaning target 01.

The vibrating screen 11 is configured to screen sharp mechanical sand before the sharp mechanical sand is put into the pipe cleaning device for a pipe cleaning operation. The vibrating screen can effectively prevent clogging caused due to the concentration of a large amount of sand, and can ensure the supply of appropriate sand according to specifications. If the sand particles are too large, the suction force of the artificial tornado is required to be greater. However, during the pipe cleaning process, the artificial tornado will not easily carry the mechanical sand. The movement trajectory of the mechanical sand will be difficult to control, affecting the pipe cleaning effect. If the sand particles are too small, the scraping and collision effect on the inner wall of the cleaning target 01 is weak, and the cleaning effect is not desired. A screen mesh of the vibrating screen 11 allows particles with a size of 1-10 mm to pass through. The vibrating screen 11 is securely connected to primary right-end flange 211 of the primary pipe cleaning device 21 through feed pipe 110 and inlet flange 111.

Figure 2:
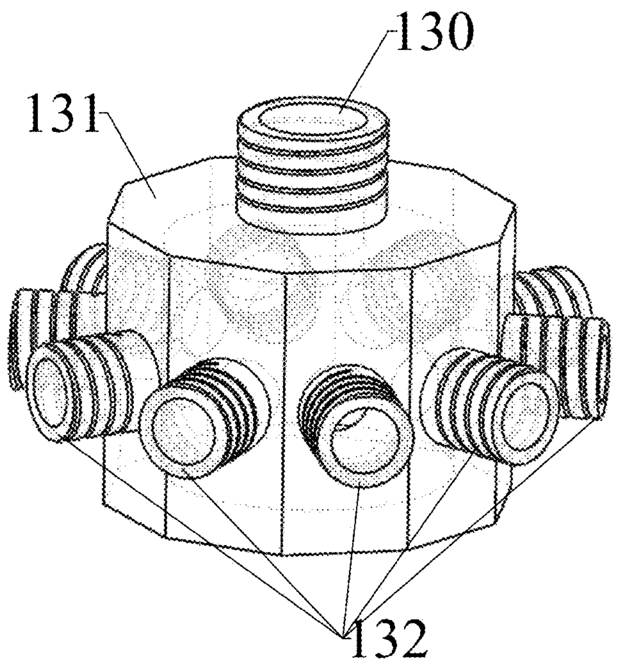
FIG. 2 is a structural diagram of a multi-channel directional valve according to the present disclosure.
Figure 3A:
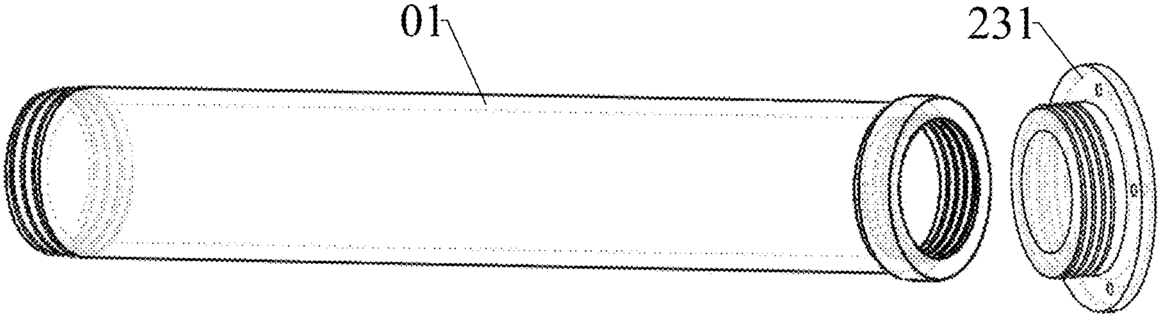
FIG. 3(*a*) is a schematic diagram showing a cleaning target with two threaded ends and an end flange of a pipe cleaning device.
Figure 3B:
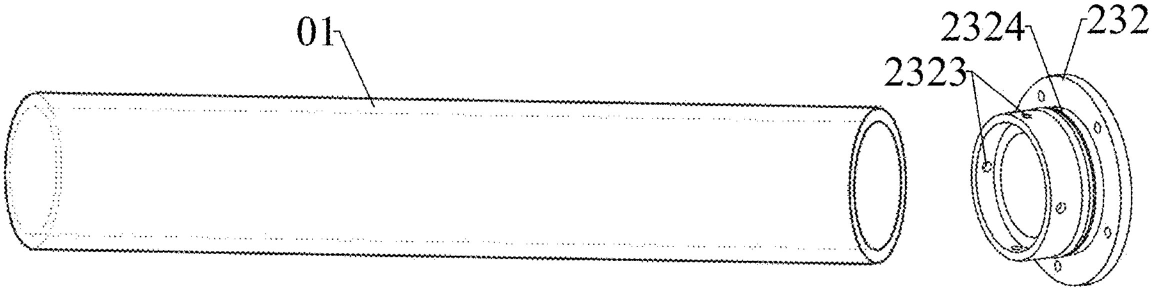
Figure 3C:
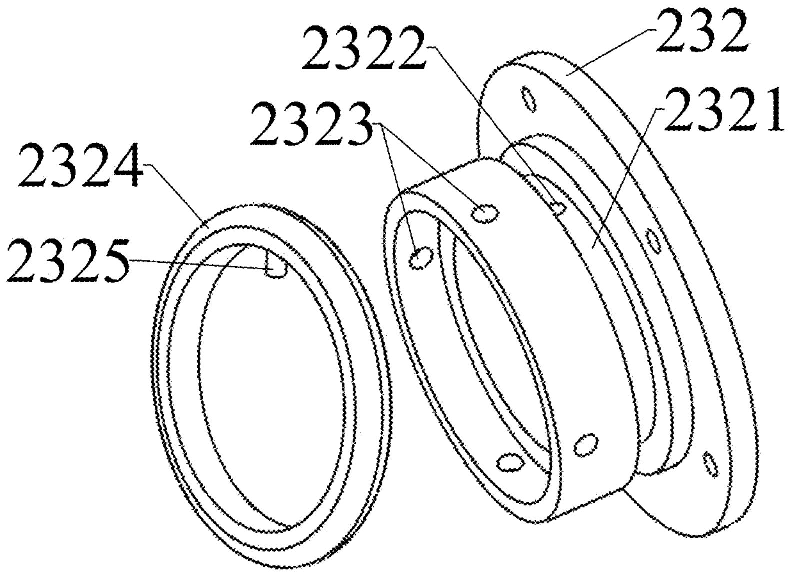
Figure 3D:
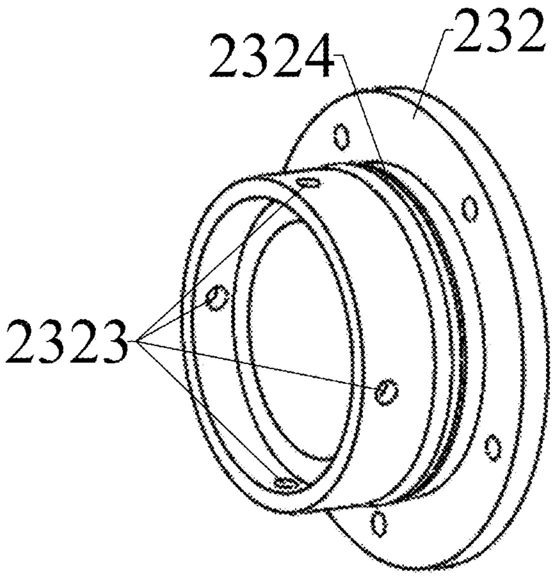

The multi-channel directional valve 13 is configured to distribute and deliver compressed air output from the air compressor 12 as needed. As shown in FIG. 2, the multi-channel directional valve mainly includes air inlet joint 130, hollow multi-channel directional valve body 131, and air outlet joints 132. Multiple primary air inlet joint pipes 213 and multiple secondary air inlet joint pipes 223 are evenly distributed on an outer wall of the primary pipe cleaning device and an outer wall of the secondary pipe cleaning device 21 and 22 in a circumferential direction, respectively. In order to increase the flow rate of the compressed air delivered to the multiple primary air inlet joint pipes and the multiple secondary air inlet joint pipes, nozzles 133 are securely connected at inlet ends of the primary air inlet joint pipes 213 and inlet ends of the secondary air inlet joint pipes 223, respectively. Each of the nozzles is provided with an internal flow channel having a necked-down section. The number of the air outlet joints 132 is greater than or equal to a sum of the number of the primary air inlet joint pipes 213 and the number of the secondary air inlet joint pipes 223. Each of the air outlet joints 132 is provided with a shut-off valve for adjusting start, stop, and a flow rate of the compressed air. The air outlet joint 132 is hermetically connected to the nozzle 133 through a high-pressure rubber hose. The air pressure and air volume of the compressed air provided by the air compressor 12 should meet the requirements of on-site working conditions. One or more parallel air compressors can be used. The number and connection method of the multi-channel directional valve 13 are flexibly adjustable according to the on-site working conditions.

Figure 5A:
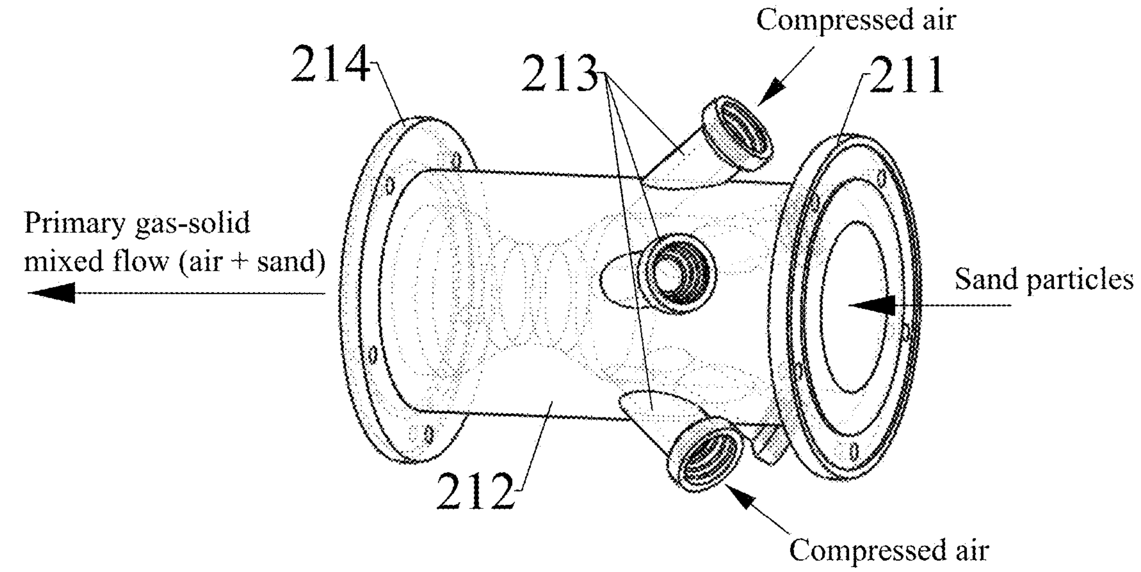
FIG. 5(*a*) is a perspective view of a primary pipe cleaning device according to the present disclosure.
Figure 5B:
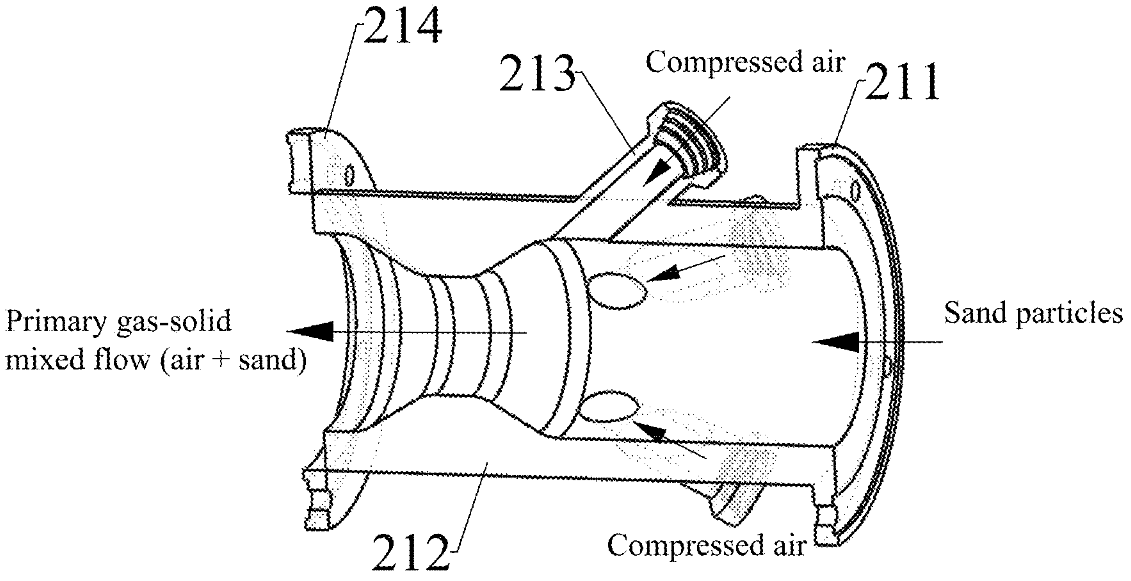

As shown in FIGS. 4(*a*) to 4(*c*) and FIGS. 5(*a*) to 5(*b*), the primary pipe cleaning device 21 mainly includes primary right-end flange 211, primary pipe cleaning device body 212, primary inlet joint pipes 213, and primary left-end flange 214. Multiple streams of the compressed air enter an inner chamber of the primary pipe cleaning device body 212 at a high speed through the multiple (3-8) primary air inlet joint pipes 213 evenly distributed on the outer wall of the primary pipe cleaning device in a circumferential direction. The multiple streams of the compressed air generate a suction force to suck the sharp mechanical sand that continuously slides into the feed pipe 110, forming a primary gas-solid (air-sand) mixed flow. A necked-down section (Laval nozzle) is located on a left side of the inner chamber of the primary pipe cleaning device body 212, before the primary air inlet joint pipes 213. When the air flow passes through the necked-down section, the flow rate of the air flow increases, thereby enhancing the suction effect of sand particles. The main purpose of the primary pipe cleaning device 21 is to continuously suck the sand particles to form the primary gas-solid mixed flow. Therefore, an axis of each of the primary air inlet joint pipes 213 is diagonally intersecting with an axis of the inner chamber of the primary pipe cleaning device body 212 in a same plane (with an angle of 20-70°). However, no artificial tornado with spiral movement is generated here. To generate an artificial tornado in the inner chamber of the primary pipe cleaning device 21, it is necessary to adjust the angle between the primary air inlet joint pipe 213 and the inner chamber of the primary pipe cleaning device body 212.

Figure 6A:
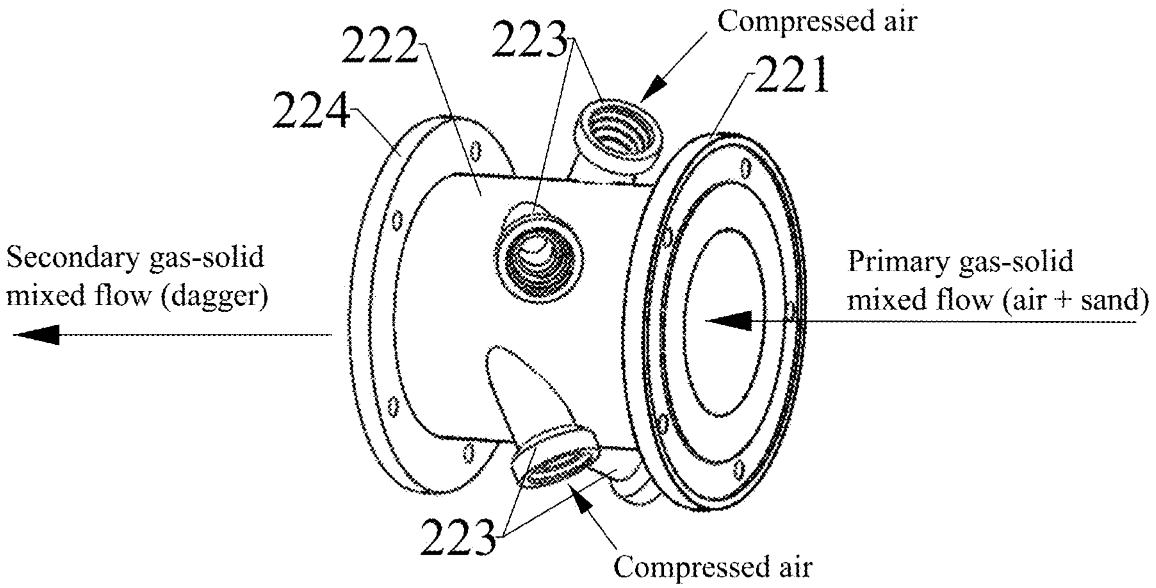
FIG. 6(*a*) is a perspective view of a secondary pipe cleaning device according to the present disclosure.
Figure 6B:
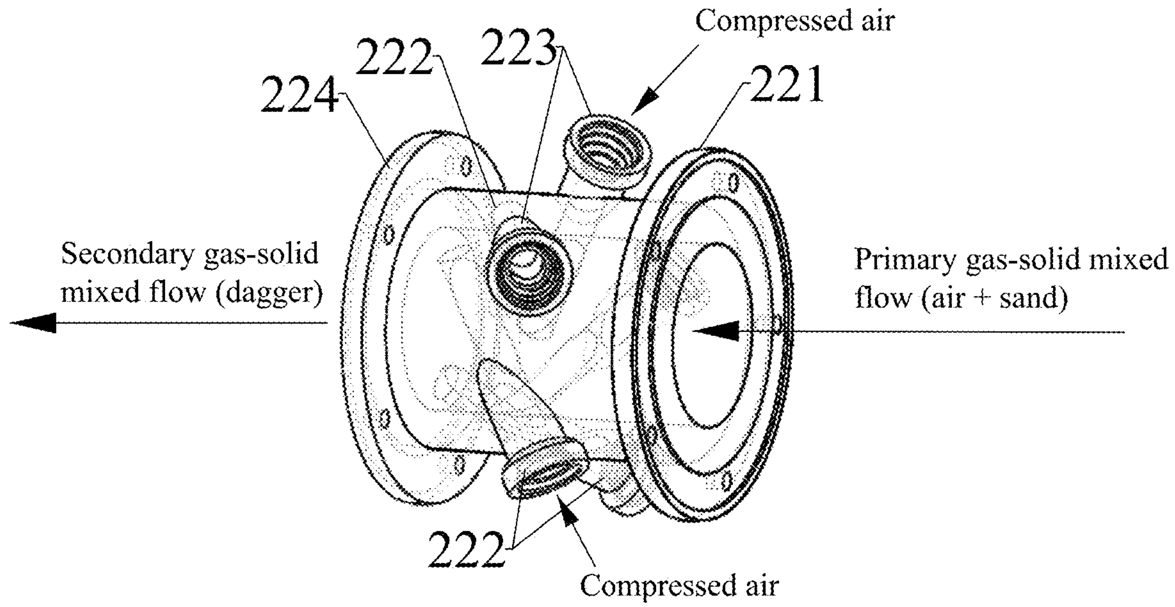

As shown in FIGS. 4(*a*) to 4(*c*) and FIGS. 6(*a*) to 6(*b*), the secondary pipe cleaning device 22 mainly includes secondary right-end flange 221, secondary pipe cleaning device body 222, secondary inlet joint pipes 223, and secondary left-end flange 224. The multiple (3-8) secondary air inlet joint pipes 223 are evenly distributed on an outer wall of the secondary pipe cleaning device in a circumferential direction. Multiple streams of the compressed air enter the inner chamber of the secondary pipe cleaning device body 222 at a high speed to generate an artificial tornado. The artificial tornado changes the movement trajectory of the primary gas-solid mixed flow formed by the primary pipe cleaning device 21, forming a secondary gas-solid mixed flow that moves forward in a spiral shape along an inner wall of the cleaning target 01. The artificial tornado also has a certain suction effect on the sand particles that slide from the vibrating screen 11. The sand particles in the secondary gas-solid mixed flow carried by the artificial tornado are like sharp daggers, continuously scraping and colliding with the inner wall of the cleaning target 01, thereby removing the dirt attached to the inner wall of the cleaning target and accumulated on the bottom of the cleaning target. The dirt is sucked and wrapped by the artificial tornado, and is discharged out of the cleaning target, thereby achieving the purpose of cleaning the inner wall of the pipe (culvert) or drill string. The main purpose of the secondary pipe cleaning device 22 is to form an artificial tornado with tangential and vertical movement and a strong suction force. Therefore, an axis of each of the secondary air inlet joint pipes 223 is diagonally tangent to a wall surface of the inner chamber of the secondary pipe cleaning device body 222 (with an angle of 25-75°), causing the multiple streams of the compressed air tangentially entering the inner chamber of the secondary pipe cleaning device at a high speed to form an air flow (i.e., the artificial tornado) that is diagonally tangent to the inner wall of the secondary pipe cleaning device and moves forward in a spiral shape. If the power of the artificial tornado formed by one secondary pipe cleaning device 22 is insufficient and the secondary gas-solid mixed flow formed is not sufficient to achieve a desired pipe cleaning effect, more than one secondary pipe cleaning device 22 can be connected in series to enhance the power of the artificial tornado.

Figure 7:
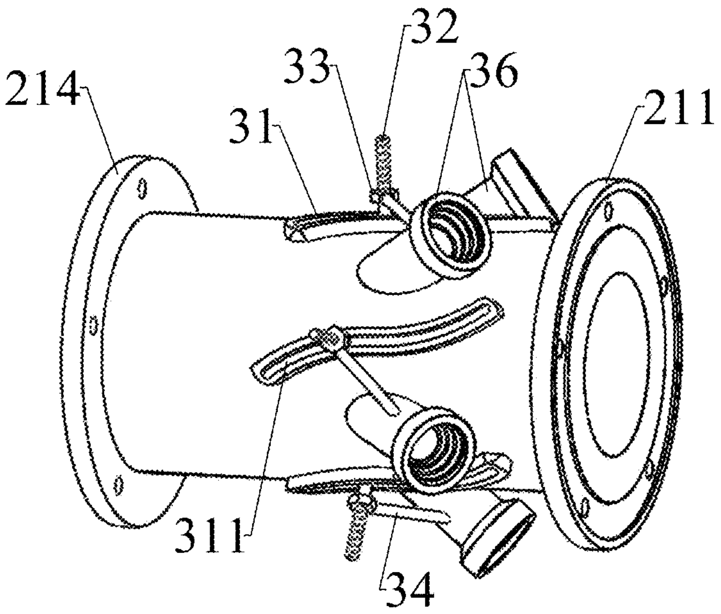
FIG. 7 is an overall structural diagram of a pipe cleaning device with an adjustable air supply angle according to the present disclosure.
Figure 8A:
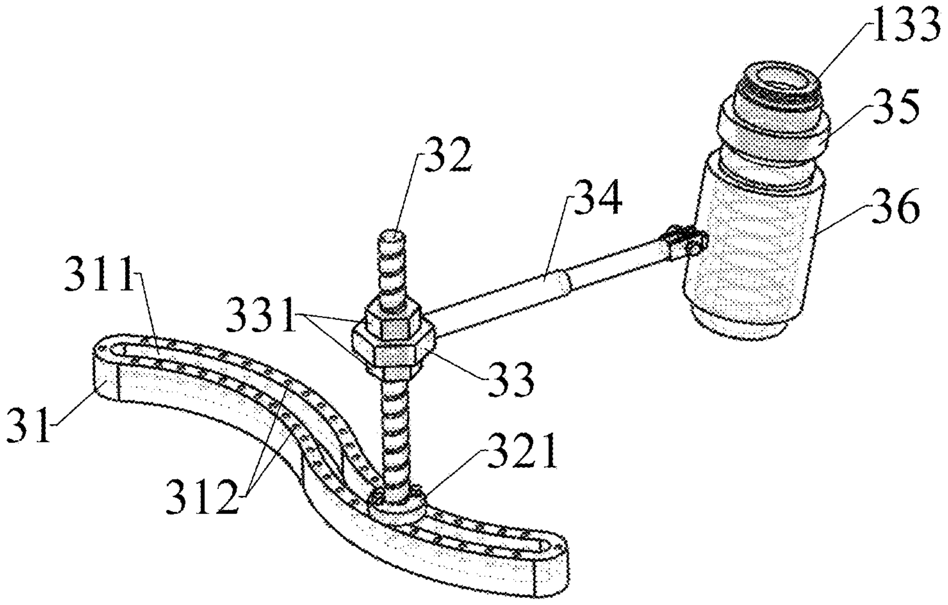
FIG. 8(*a*) is a perspective view of an adjustable joint pipe according to the present disclosure.
Figure 8B:
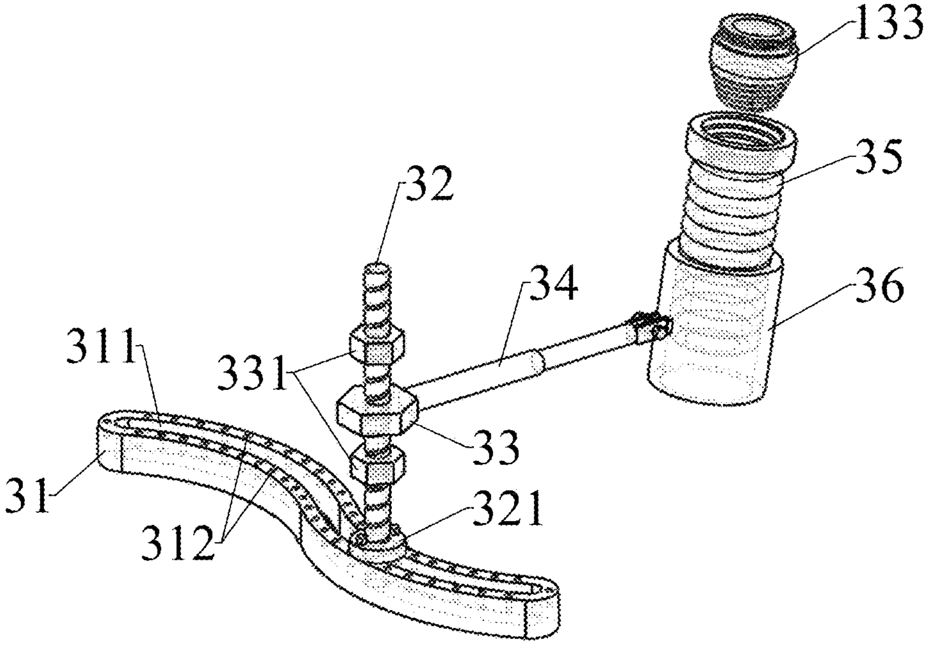

As shown in FIG. 7, the primary air inlet joint pipes 213 and the secondary air inlet joint pipes 223 are adjustable joint pipes. Each of the adjustable joint pipes is provided with an angle-adjustable structure. The angle-adjustable structure includes flexible corrugated pipe 35 and rigid sleeve 36 coaxially sleeved outside the flexible corrugated pipe. The S-shaped guide rail 31, the guide screw 32, the adjusting nut 33, and the telescopic guide rod 34 form a crank-connecting angle changing mechanism. As shown in FIGS. 8(*a*) to 8(*b*), specifically, the S-shaped guide rails 31 are evenly arranged on each of the outer wall of the primary pipe cleaning device 21 and the outer wall of the secondary pipe cleaning device 22 at intervals, respectively. The S-shaped guide rail 31 can be fixed to the outer wall of the pipe cleaning device through a screw or strong adhesive. A bottom end of the guide screw 32 is provided with a slider nested inside the guide groove 311. The guide screw 32 is freely slidable along the guide groove 311 in an S-shape. Atop surface of guide groove 311 is provided with multiple limit holes 312 at intervals. A lower part of the guide screw 32 is provided with a limit base 321 having screw holes on two sides. When the guide screw 32 slides to a suitable position, the limit base 321 can be securely connected to the limit holes 312 through screws to fix the guide screw 32. The adjusting nut 33 is freely rotatable up and down along a thread of the guide screw 32. One end of the telescopic guide rod 34 is securely connected to a middle part of the adjusting nut 33. When the adjusting nut 33 is rotated to a suitable position, the adjusting nut can be tightened by fastening nuts 331 provided on two sides of the adjusting nut. The other end of the telescopic guide rod 34 is hinged with the rigid sleeve 36. The rigid sleeve 36 is coaxially sleeved outside the flexible corrugated pipe 35. The flexible corrugated pipe 35 is hermetically connected to each of the inner chamber of the primary pipe cleaning device body 212 and the inner chamber of the secondary pipe cleaning device body 222. By adjusting the length of the telescopic guide rod 34 and the positions of the guide screw 32 and the adjusting nut 33, the angle of the rigid sleeve 36 can be adjusted, thereby adjusting an inclination angle of the flexible corrugated pipe 35.

The joint of the actual cleaning target 01 is not a fixed-type joint, and is usually a flanged, threaded, or flat-end joint. The joint type of the outlet flange 23 connected to the end of the cleaning target 01 can be flexibly selected according to the actual working conditions. As shown in FIG. 3(*a*), if the joint of the cleaning target 01 is a flanged joint, the secondary left-end flange 224 can be directly used. If the joint of the cleaning target 01 is a threaded joint, a threaded outlet flange 231 with a threaded joint on one side can be used. As shown in FIGS. 3(*b*), 3(*c*), and 3(*d*), if the joint of the cleaning target 01 is a flat-end joint, a flat-end outlet flange 232 with clamping groove 2321, positioning hole 2322, screw hole 2323, and expansion seal ring 2324 can be used. The expansion seal ring 2324 is made of rubber and can be inflated to expand or deflated to contract through inflation valve 2325. The expansion seal ring 2324 is nested in the clamping groove 2321, and the inflation valve 2325 of the expansion seal ring 2324 extends downwards from the positioning hole 2322. In order to facilitate the connection with the end of flat-joint cleaning target 01, the expansion sealing ring 2324 is initially not inflated but is in a contracting state. Flat-end outlet flange 232 with a suitable specification is nested in the flat-joint of the cleaning target 01. A screw passes through the screw hole 2323 and is securely connected to the inner wall of the cleaning target 01. A small air compressor is used to inflate the expansion seal ring 2324 through the inflation valve 2325 to make the expansion seal ring tightly fit with the inner wall of the cleaning target 01, thereby achieving the purpose of secure connection.

Each two flanges are connected together by bolt 25.

When it is necessary to perform in-situ trenchless pipe cleaning on the interior of an existing underground pipe (culvert) that has been in use for a certain period of time, or to clean the interior of a drill string after a drilling operation is completed, a first step is to select a suitable pipe cleaning device based on the specification, joint type, and internal dirt attachment/accumulation state of the cleaning target 01.

The components of each part are hermetically connected according to the actual working conditions on site, ensuring that there is no air leakage at the pipes and joints. According to the number of the primary air inlet joint pipes 213 and the secondary air inlet joint pipes 223, shut-off valves of the corresponding air outlet joints 132 of the multi-channel directional valve 13 is opened. The air compressor 12 is started to deliver compressed air with a certain air pressure and air volume to the inner chamber of the primary pipe cleaning device body 212 and the inner chamber of the secondary pipe cleaning device body 222 through the multi-channel directional valve 13, the multiple high-pressure rubber hoses, the multiple nozzles 133, the primary air inlet joint pipes 213, and the secondary air inlet joint pipes 223. If the pipe cleaning on-site conditions permit, the mechanical sand can be one with required specifications directly purchased from the building materials market, or can be prepared by crushing large stones or construction solid waste to the required specifications through a rock crusher. The vibrating screen 11 is started, and the sharp mechanical sand is slowly poured onto a screen mesh of the vibrating screen 11. After being filtered by the screen mesh, sand particles with a size of 1-10 mm enter the vibrating screen 11 and slide along the feed pipe 110 to a region adjacent to the primary right-end flange 211. The sand particles are sucked by multiple streams of diagonally supplied high-speed air in the inner chamber of the primary pipe cleaning device body 212, forming a primary gas-solid mixed flow, and are carried to the inner chamber of the secondary pipe cleaning device body 222. Multiple streams of diagonally tangential high-speed air enter the inner chamber of the secondary pipe cleaning device body 222 to form an artificial tornado. The artificial tornado changes the movement trajectory of the primary gas-solid mixed flow entering the inner chamber of the secondary pipe cleaning device body 222 into a spiral shape, tangential with the inner wall of the cleaning target 01, and drives the primary gas-solid mixed flow to move forward, forming a secondary gas-solid mixed flow. During this process, the sand particles continuously scrape and collide with the inner wall of the cleaning target 01. The sand particles are like sharp daggers, allowing the dirt attached to the inner wall of the cleaning target and accumulated on the bottom of the cleaning target to be continuously peeled off.

As shown in FIG. 1(*a*), if the outlet end of the cleaning target 01 is connected to the sewage storage tank 14, the dirt sucked and carried by the artificial tornado is discharged into the sewage storage tank 14 along with the secondary gas-solid mixed flow. As shown in FIG. 1(*b*), if the outlet end of the cleaning target 01 is connected to the sewage suction truck 15, the dirt sucked and carried by the artificial tornado is mixed with the secondary gas-solid mixed flow, and is discharged into the sewage suction truck 15. In this case, the dirt is also subjected to the suction force of the sewage suction truck 15. As shown in FIG. 1(*c*), if the outlet end of the cleaning target 01 is connected to the primary pipe cleaning device 21 and the secondary pipe cleaning device 22, the dirt is discharged to the sewage storage tank 14 or the sewage suction truck 15 under the suction action of double artificial tornados.

During the pipe cleaning process, if it is found that the primary gas-solid mixed flow formed in the primary pipe cleaning device 21 and the secondary gas-solid mixed flow formed in the secondary pipe cleaning device 22 cannot achieve a desired pipe cleaning effect, the air pressure and air volume of the compressed air output by the air compressor should be increased. In addition, the fixed-type primary air inlet joint pipes 213 and the fixed-type secondary air inlet joint pipes 223 can be transformed into an angle-adjustable structure. That is, the positions of the guide screws 32, the adjusting nuts 33, the telescopic guide rods 34, the flexible corrugated pipes 35, and the rigid sleeves 36 are adjusted in a reasonable manner. Thus, the incoming states of the multiple streams of high-speed air entering the inner chamber of the primary pipe cleaning device body 212 through the primary air inlet joint pipes 213 and the inner chamber of the secondary pipe cleaning device body 222 through the secondary air inlet joint pipes 223 are adjusted. In this way, the movement state of the primary gas-solid mixed flow generated in the inner chamber of the primary pipe cleaning device body 212 and the movement state of the secondary gas-solid mixed flow generated in the secondary pipe cleaning device body 222 can be adjusted. All these attempts can achieve the desired pipe cleaning effect.

After the pipe cleaning operation is completed, a closed-circuit television (CCTV) pipe detection robot (system) can be placed into the cleaning target 01 to check the condition of the inner wall of the cleaning target 01. When it is confirmed that the cleaning effect is acceptable, various components can be removed, and the on-site environment can be restored.

What is claimed is:

1. A trenchless multi-stage pipe cleaning device combining an artificial tornado and dagger-like mechanical sand, comprising a front-end pipe cleaning device, wherein the front-end pipe cleaning device comprises a primary pipe cleaning device and a secondary pipe cleaning device;

the primary pipe cleaning device comprises a primary right-end flange, a primary pipe cleaning device body and a primary left-end flange that are connected in sequence; multiple primary air inlet joint pipes are evenly distributed on an outer wall of the primary pipe cleaning device in a circumferential direction; and an axis of each of the primary air inlet joint pipes is diagonally intersecting with an axis of an inner chamber of the primary pipe cleaning device body in a same plane;

the secondary pipe cleaning device comprises a secondary right-end flange, a secondary pipe cleaning device body and a secondary left-end flange that are connected in sequence; multiple secondary air inlet joint pipes are evenly distributed on an outer wall of the secondary pipe cleaning device in the circumferential direction; and an axis of each of the secondary air inlet joint pipes is diagonally tangent to a wall surface of an inner chamber of the secondary pipe cleaning device body;

the primary left-end flange is connected to the secondary right-end flange, such that the primary pipe cleaning device is hermetically connected to the secondary pipe cleaning device;

the primary air inlet joint pipes and the secondary air inlet joint pipes are hermetically connected to air outlet joints of a multi-channel directional valve, respectively; the multi-channel directional valve further comprises an air inlet joint and a hollow multi-channel directional valve body; the air inlet joint is connected to an air compressor; each of the air outlet joints is connected to a nozzle provided with an internal flow channel having a necked-down section; and each of the air outlet joints is provided with a shut-off valve for adjusting start, stop, and a flow rate of a compressed air flow; and the primary right-end flange of the primary pipe cleaning device is securely connected to an inlet flange of a feed pipe, and the feed pipe is connected to a discharge hole of a vibrating screen.

2. The trenchless multi-stage pipe cleaning device combining the artificial tornado and the dagger-like mechanical sand according to claim 1, further comprising a back-end sewage discharge device, wherein the front-end pipe cleaning device is mounted at one end of a cleaning target, and another end of the cleaning target is connected to the back-end sewage discharge device.

3. The trenchless multi-stage pipe cleaning device combining the artificial tornado and the dagger-like mechanical sand according to claim 1, wherein the primary air inlet joint pipes and the secondary air inlet joint pipes are adjustable joint pipes.

4. The trenchless multi-stage pipe cleaning device combining the artificial tornado and the dagger-like mechanical sand according to claim 3, wherein each of the adjustable joint pipes comprises a rigid sleeve and a crank-connecting angle changing mechanism; the crank-connecting angle changing mechanism comprises an S-shaped guide rail, a guide screw, an adjusting nut, and a telescopic guide rod; the S-shaped guide rail is provided with a guide groove; a bottom end of the guide screw is provided with a slider nested inside the guide groove; the guide screw is slidable freely along the guide groove in an S-shape; a top surface of the guide groove is provided with multiple limit holes at intervals; a lower part of the guide screw is provided with a limit base having screw holes on two sides; and when the guide screw slides to a suitable position, the limit base is securely connected to the limit holes through screws to fix the guide screw;

a thread of the guide screw is connected to a thread of the adjusting nut;

the adjusting nut is fixed at one end of the telescopic guide rod, and upper and lower sides of the adjusting nut are provided with fastening nuts; and the other end of the telescopic guide rod is hinged with the rigid sleeve; the rigid sleeve is coaxially sleeved outside a flexible corrugated pipe; and the flexible corrugated pipe is hermetically connected to each of the inner chamber of the primary pipe cleaning device body and the inner chamber of the secondary pipe cleaning device body wherein the plurality of S-shaped guide rails are evenly arranged on each of the outer wall of the primary pipe cleaning device and the outer wall of the secondary pipe cleaning device at intervals.

5. A trenchless multi-stage pipe cleaning method combining an artificial tornado and dagger-like mechanical sand, using the trenchless multi-stage pipe cleaning device combining the artificial tornado and the dagger-like mechanical sand according to claim 1, and comprising the following steps:

mounting the front-end pipe cleaning device at one end of cleaning target, and connecting another end of the cleaning target to back-end sewage discharge device;

opening shut-off valves of corresponding air outlet joints of the multi-channel directional valve according to a number of the primary air inlet joint pipes and a number of the secondary air inlet joint pipes; and starting the air compressor to deliver compressed air with a certain air pressure and air volume to the inner chamber of the primary pipe cleaning device body and the inner chamber of the secondary pipe cleaning device body through the multi-channel directional valve, the nozzles, the primary air inlet joint pipes, and the secondary air inlet joint pipes;

starting the vibrating screen, and pouring mechanical sand particles onto a screen mesh of the vibrating screen; allowing sand particles filtered by the screen mesh to enter into the vibrating screen and slide along the feed pipe to a region adjacent to the primary right-end flange; sucking the sand particles by multiple streams of diagonally supplied high-speed air in the inner chamber of the primary pipe cleaning device body to form a primary gas-solid mixed flow, and allowing the primary gas-solid mixed flow to enter the inner chamber of the secondary pipe cleaning device body; forming the artificial tornado by multiple streams of diagonally tangential high-speed air entering the inner chamber of the secondary pipe cleaning device body; changing, by the artificial tornado, a movement trajectory of the primary gas-solid mixed flow entering the inner chamber of the secondary pipe cleaning device body into a spiral shape, tangential with an inner wall of the cleaning target; and driving the primary gas-solid mixed flow to move forward to form a secondary gas-solid mixed flow; wherein the sand particles continuously scrape and collide with the inner wall of the cleaning target, such that dirt attached to the inner wall of the cleaning target and accumulated on a bottom of the cleaning target is continuously removed;

if the primary gas-solid mixed flow formed in the primary pipe cleaning device and the secondary gas-solid mixed flow formed in the secondary pipe cleaning device are found not sufficient to achieve a desired pipe cleaning effect, increasing the air pressure and air volume of the compressed air output by the air compressor; alternatively, adjusting inclination angles of the primary air inlet joint pipes and inclination angles of the secondary air inlet joint pipes, so as to adjust a movement state of the primary gas-solid mixed flow formed in the inner chamber of the primary pipe cleaning device body and a movement state of the secondary gas-solid mixed flow formed in the inner chamber of the secondary pipe cleaning device body, until the desired pipe cleaning effect is achieved; and discharging the removed dirt into the back-end sewage discharge device.

6. The trenchless multi-stage pipe cleaning method combining the artificial tornado and the dagger-like mechanical sand according to claim 5, wherein the trenchless multi-stage pipe cleaning device combining the artificial tornado and the dagger-like mechanical sand further comprises the back-end sewage discharge device.

7. The trenchless multi-stage pipe cleaning method combining the artificial tornado and the dagger-like mechanical sand according to claim 5, wherein in the trenchless multi-stage pipe cleaning device combining the artificial tornado and the dagger-like mechanical sand, the primary air inlet joint pipes and the secondary air inlet joint pipes are adjustable joint pipes.

8. The trenchless multi-stage pipe cleaning method combining the artificial tornado and the dagger-like mechanical sand according to claim 7, wherein in the trenchless multi-stage pipe cleaning device combining the artificial tornado and the dagger-like mechanical sand, each of the adjustable joint pipes comprises a rigid sleeve and a crank-connecting angle changing mechanism; the crank-connecting angle changing mechanism comprises an S-shaped guide rail, a guide screw, an adjusting nut, and a telescopic guide rod; the S-shaped guide rail is provided with a guide groove; a bottom end of the guide screw is provided with a slider nested inside the guide groove; the guide screw is slidable freely along the guide groove in an S-shape; a top surface of the guide groove is provided with multiple limit holes at intervals; a lower part of the guide screw is provided with a limit base having screw holes on two sides; and when the guide screw slides to a suitable position, the limit base is securely connected to the limit holes through screws to fix the guide screw;

a thread of the guide screw is connected to a thread of the adjusting nut;

the adjusting nut is fixed at one end of the telescopic guide rod, and upper and lower sides of the adjusting nut are provided with fastening nuts; and the other end of the telescopic guide rod is hinged with the rigid sleeve; the rigid sleeve is coaxially sleeved outside a flexible corrugated pipe; and the flexible corrugated pipe is hermetically connected to each of the inner chamber of the primary pipe cleaning device body and the inner chamber of the secondary pipe cleaning device body wherein the plurality of S-shaped guide rails are evenly arranged on each of the outer wall of the primary pipe cleaning device and the outer wall of the secondary pipe cleaning device at intervals.

* * * * *